(12) United States Patent
Nagrockas et al.

(10) Patent No.: US 12,250,199 B2
(45) Date of Patent: Mar. 11, 2025

(54) ENHANCED PRIVACY PRESERVING ACCESS TO A VPN SERVICE

(71) Applicant: 360 IT, UAB, Vilnius (LT)

(72) Inventors: Povilas Nagrockas, Kaunas (LT); Emanuelis Norbutas, Vilnius (LT)

(73) Assignee: 360 IT, UAB, Vilnius (LT)

( * ) Notice: Subject to any disclaimer, the term of this patent is extended or adjusted under 35 U.S.C. 154(b) by 0 days.

(21) Appl. No.: 18/170,924

(22) Filed: Feb. 17, 2023

(65) Prior Publication Data

US 2023/0336529 A1 Oct. 19, 2023

Related U.S. Application Data

(63) Continuation of application No. 16/898,374, filed on Jun. 10, 2020, now Pat. No. 11,611,536.

(51) Int. Cl.
| | | |
|---|---|---|
| *H04L 9/40* | (2022.01) | |
| *H04L 9/30* | (2006.01) | |
| *H04L 12/46* | (2006.01) | |
| *H04L 45/7453* | (2022.01) | |
| *H04L 61/2539* | (2022.01) | |
| *H04L 61/2592* | (2022.01) | |

(52) U.S. Cl.
CPC ............ *H04L 63/0272* (2013.01); *H04L 9/30* (2013.01); *H04L 12/4633* (2013.01); *H04L 12/4641* (2013.01); *H04L 45/7453* (2013.01); *H04L 61/2539* (2013.01); *H04L 61/2592* (2013.01); *H04L 63/0876* (2013.01); *H04L 63/0892* (2013.01)

(58) Field of Classification Search
CPC ............ H04L 63/0272; H04L 63/0876; H04L 63/0892; H04L 9/30; H04L 12/4633; H04L 12/4641; H04L 45/74; H04L 45/745; H04L 45/7453; H04L 61/25; H04L 61/2503; H04L 61/2539; H04L 61/2592
See application file for complete search history.

(56) References Cited

U.S. PATENT DOCUMENTS 8,259,571 B1 * 9/2012 Raphel ................ H04L 61/2535
370/252
8,776,209 B1 * 7/2014 Kumar ................ H04L 63/0815
709/225

(Continued)

OTHER PUBLICATIONS

Park, et al., A Service Protection mechanism Using VPN GW Hiding Techniques, 2015.

*Primary Examiner* — Jeremy S Duffield
(74) *Attorney, Agent, or Firm* — Young Basile Hanlon & MacFarlane, P.C.

(57) ABSTRACT

A request is received from a user device to establish a VPN tunnel. The VPN tunnel is established with a first private IP address of the VPN concentrator and a second private IP address of the user device as endpoints. An outbound packet for transmission to a target is received from the user device. A third private IP address associated with the tunnel is looked up based on a VPN session. A substitution of the first private IP address with the third private IP address in a header of the outbound packet is performed. NAT is performed on the outbound packet to replace the third private IP address with a third public IP address of the VPN concentrator. The outbound packet is then transmitted to the target.

20 Claims, 5 Drawing Sheets

(56) References Cited

U.S. PATENT DOCUMENTS

| | | | |
|---|---|---|---|
| 9,215,075 B1* | 12/2015 | Poltorak | H04L 63/0823 |
| 9,692,757 B1* | 6/2017 | Mikulski | H04L 9/3234 |
| 2002/0141352 A1 | 10/2002 | Fangman et al. | |
| 2003/0041091 A1 | 2/2003 | Cheline et al. | |
| 2003/0214955 A1* | 11/2003 | Kim | H04L 12/4633 |
| | | | 370/389 |
| 2006/0031407 A1 | 2/2006 | Dispensa et al. | |
| 2006/0230446 A1* | 10/2006 | Vu | H04L 63/166 |
| | | | 726/15 |
| 2007/0022477 A1 | 1/2007 | Larson | |
| 2008/0196098 A1 | 8/2008 | Cottrell et al. | |
| 2009/0031404 A1* | 1/2009 | Bazzinotti | H04L 61/25 |
| | | | 726/6 |
| 2009/0122990 A1 | 5/2009 | Gundavelli et al. | |
| 2011/0131647 A1 | 6/2011 | Sanders et al. | |
| 2011/0154477 A1 | 6/2011 | Parla et al. | |
| 2013/0182712 A1 | 7/2013 | Aguayo et al. | |
| 2015/0188887 A1 | 7/2015 | Thomas et al. | |
| 2016/0234039 A1* | 8/2016 | Ng | H04L 45/245 |
| 2019/0158605 A1* | 5/2019 | Markuze | H04L 69/163 |
| 2020/0162431 A1* | 5/2020 | Goldschlag | H04L 63/20 |

* cited by examiner

ENHANCED PRIVACY PRESERVING ACCESS TO A VPN SERVICE

CROSS-REFERENCE TO RELATED APPLICATION(S)

This application is a continuation of U.S. patent application Ser. No. 16/898,374, filed Jun. 10, 2020, the entire disclosure of which is hereby incorporated by reference.

FIELD

Systems and methods are disclosed for privacy-preserving access to a Virtual Private Network (VPN) service through a VPN concentrator (VC), mediated by an Identity Provider (IDP). Such access is unlinkable to any previous or future accesses of the user to the VPN service through the VC. A network identity concealing system is disclosed. Such a system allows a large number of different network entities to access the VPN service using only a small number of secrets or credentials held by each user behind those network entities without establishing a hard link between the user proven identity and a particular VPN service access session. The secret or credentials held by the user can be used while authenticating against an IDP or obtaining a network access token for confirmation of access privilege and/or of selective partial disclosure of user characteristics required for access at the VC.

BACKGROUND

Traditionally client access to a public Internet-placed service involves some sort of a user authentication, usually by credentials, security tokens, or others, with such authentication registered within a security log either locally or at a remote authentication and authorization backend for the service.

Users connecting to a service through the network, as well as the corresponding protocol sessions, are traced in real time at the service provider's side. Consequently, the activities are registered and logged by local or remote system logging facilities, storing the corresponding logs for a multitude of reasons e.g. incident management, regulation compliance requirements, long-term tendencies analysis, etc. These logs traditionally contain enough information to reconstruct the relevant context, e.g. from an incident being investigated, to a particular network session, to a particular user, or to a particular authentication session.

Due to the distributed nature of IT platforms underlying contemporary public services, investigating any isolated client session requires scrutiny of logs across multiple infrastructure components. Correlating information from multiple systems for a particular event involves the possibility of linking disparate bits and pieces of information with a primary key element, quite possibly the identification of the client or the platform.

Business to consumer (B2C) VPN service has a strong emphasis on client privacy protection as the primary value the VPN access brings to the users. In order for client traffic to be protected from eavesdropping by third parties due to accessing the Internet through a VPN tunnel, B2C VPN service security encompasses strong encryption throughout, including elaborate authentication schemes and robust verification flows.

Moreover, client privacy protection is built upon the user's VPN sessions leaving no traces in the system logs at the provider's side, as well as authentication artifacts and instances of authentication flows not linked to VPN sessions, VPN traffic, or encryption artefacts of any particular client.

"Zero knowledge" is the notion B2C VPN service providers position at the core of privacy protection. Essentially the principle signifies the provisioning of the VPN service and is feasible when no client activity-linked information is being accumulated or kept at the provider. This privacy protection is achieved through performing the initial user authentication with a minimally feasible set of user-identity tokens and eliminating what could be construed as a hard link between user identity within the VPN service infrastructure and network activity within the service, including by not recording any VPN user session logs.

However, apart from the regular network and authentication activity logs harming and/or compromising the privacy of the client, some VPN protocols and implementations lack IP management functionality i.e. dynamic IP address allocation to a connecting client from a managed IP pool, the IP address reservation, de-allocation of an IP address or a refresh of the IP address. Some products may require establishing a hard-coded one-to-one client link to an IP address, stored locally at the VPN concentrator within configuration files, which can further compromise the concealment of the user's identity.

The proposed solution provides an effective way to ensure the absence of the overhead IP address assignment protocol or functionality, or of a hard-coded connection between user's identity and user's network activity in the context of VPN transport connectivity. The solution masks the user's network identification by a double Network Address Translation (NAT) feature, where the NAT sequence: "Dynamic Private Address↔Static Public Address:Port" is changed to the cryptographically enhanced sequence: "Public Key, Static Private Address↔Dynamic Private IP Address", with the fully detailed sequence as follows: "Public Key, Static Private Address↔Dynamic Private Address↔Static Public Address:Port".

The following sections elaborate and clarify the technology notions the solution employs, is dependent upon or is related to, including encryption in general, authentication methodologies, and attack vectors mitigation.

In cryptography, encryption is the process of encoding a message or information in such a way that only authorized parties can access the message or information and those who are not authorized cannot. Encryption does not itself prevent interference, but denies the intelligible content to a would-be interceptor. In an encryption scheme, the intended information or message, referred to as plaintext, is encrypted using an encryption algorithm—a cipher—generating ciphertext that can be read only if decrypted. For technical reasons, an encryption scheme usually uses a pseudorandom encryption key generated by an algorithm. It is in principle possible to decrypt the message without possessing the key, but, for a well-designed encryption scheme, considerable computational resources and skills are required. An authorized recipient can easily decrypt the message with the key provided by the originator but unauthorized users cannot decrypt the message.

Symmetric and asymmetric cryptographic systems are two major approaches to encryption technique. Symmetric-key cryptography refers to a cryptographic system that employs the same key for both data encryption and decryption. This means that all participants of the data exchange have to know the same key to be able to securely send the encrypted message and to decrypt the encrypted messages received. Therefore, the key is shared among parties, but secreted from third parties—in order to keep communications private—the key is considered a shared secret. No adversary can decrypt the message without knowing the secret key.

Public-key cryptography, or asymmetric cryptography, refers to a cryptographic system that uses pairs of keys: public keys which are to be accessible freely, and private keys which are only accessible to the owner. The generation of such keys depends on cryptographic algorithms based on mathematical problems to produce one-way functions. Effective security only requires keeping the private key private; the public key can be openly distributed without compromising security. In such a system, any person can encrypt a message using the receiver's public key, but that encrypted message can only be decrypted with the receiver's private key.

In cryptography, a key-agreement protocol is a protocol whereby two or more parties can agree on a key in such a way that both influence the outcome. If properly done, this precludes undesired third parties from forcing a key choice on the agreeing parties. Protocols that are useful in practice also do not reveal to any eavesdropping party which key has been agreed upon.

Many key exchange systems have one party generate the key, and simply send that key to the other party—the other party having no influence on the key. Using a key-agreement protocol avoids some of the key distribution problems associated with such systems. Protocols where both parties influence the final derived key are the only way to implement perfect forward secrecy.

An example of key agreement protocol may be Elliptic-curve Diffie-Hellman (ECDH), a key agreement protocol that allows two parties, each having an elliptic-curve public-private key pair, to establish a shared secret over an insecure channel. This shared secret may be directly used as a key, or used to derive another key. The key, or the derived key, can then be used to encrypt subsequent communications using a symmetric-key cipher. It is a variant of the Diffie-Hellman protocol using elliptic-curve cryptography.

An important part of cryptography is the notion of key derivation, where a key derivation function (KDF) derives one or more secret keys from a secret value such as a master key, a password, or a passphrase using a pseudorandom function. KDFs can be used to stretch keys into longer keys or to obtain keys of a required format, such as converting a group element that is the result of a Diffie-Hellman key exchange into a symmetric key for use with Advanced Encryption Standard (AES). Keyed cryptographic hash functions are popular examples of pseudorandom functions used for key derivation.

A cryptographic hash function is a hash function which takes an input (or 'message') and returns a fixed-size string of bytes. The string is called the 'hash value', 'message digest', 'digital fingerprint', 'digest' or 'checksum'. The ideal hash function has three main properties: 1) It is easy to calculate a hash for any given data. 2) It is computationally difficult to calculate an alphanumeric text that has a given hash. 3) It is unlikely that two slightly different messages will have the same hash.

VPN technology allows a network entity to connect to a private network over a public network. Traditionally the main function of VPN has been to allow for a roaming client, or a distant office connected to a public network, to connect to a private network for accessing private resources, e.g., business applications within a corporate LAN.

VPN technology was developed to allow remote users and branch offices to access corporate applications and resources. To ensure security, the private network connection is established using an encrypted layered tunneling protocol and VPN users use authentication methods, including passwords or certificates, to gain access to the VPN. In other applications, Internet users may secure their connections with a VPN, to circumvent geo-restrictions and censorship, or to connect to proxy servers to protect personal identity and location to stay anonymous on the Internet.

The possible classification of VPNs may be based on the tunneling protocol used, the tunnel's termination point location, e.g. on the client edge or network-provider edge, the topology of connections, such as site-to-site or user remote access, the levels of security provided and others.

As an example of a VPN type by topology Site-to-Site VPN, also called Router-to-Router VPN, is commonly used in large companies. Companies or organizations with branch offices in different locations use Site-to-site VPN to connect the network of one office location to the network at another office location.

Basically, a Site-to-site VPN creates a virtual bridge between the networks at geographically distant offices and connects them through the Internet and sustains secure and private communication between the networks. In Site-to-site VPN one router acts as a VPN Client and another router as a VPN concentrator, as it is based on Router-to-Router communication. When the authentication is validated between the two routers, only then will the communication start.

Types of Virtual Private Network (VPN) by protocol can be divided into Internet Protocol Security (IPSec), Layer 2 Tunneling Protocol (L2TP), Point-to-Point Tunneling Protocol (PPTP), SSL and TLS or OpenVPN.

IPSec is used to secure Internet communication across an IP network. IPSec secures Internet Protocol communication by verifying the session and encrypts each data packet during the connection. IPSec runs in 2 modes: (i) Transport mode; (ii) Tunneling mode.

Transport mode encrypts the message in the data packet, while tunneling mode encrypts the whole data packet. IPSec can also be used with other security protocols to improve the security system.

L2TP is a tunneling protocol that is often combined with another VPN security protocol like IPSec to establish a highly secure VPN connection. L2TP establishes a tunnel between two L2TP connection points and IPSec protocol encrypts the data and maintains secure communication between the tunnel.

PPTP generates a tunnel and confines the data packet to the tunnel. Point-to-Point Protocol (PPP) may include some levels of authentication and encryption for the data between the connections. PPTP is one of the most widely used VPN protocols and has been in use since the early release of Windows. PPTP is also used on Mac and Linux apart from Windows.

TLS and SSL: Transport Layer Security (TLS), and its now-deprecated predecessor, Secure Sockets Layer (SSL), are cryptographic protocols designed to provide communications security over a computer network. Several versions of the protocols find widespread use in applications such as web browsing, email, instant messaging, and voice over IP (VoIP). Websites can use TLS to secure all communications between their servers and web browsers.

The TLS protocol aims primarily to provide privacy and data integrity between two or more communicating computer applications. When secured by TLS, connections between a client (e.g., a web browser) and a server (e.g., wikipedia.org) should have one or more of the following properties:

The connection is private (or secure) because symmetric cryptography is used to encrypt the data transmitted. The keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

The identity of the communicating parties can be authenticated using public-key cryptography. This authentication can be made optional but is generally required for at least one of the parties (typically the server).

The connection is reliable because each message transmitted includes a message integrity check using a message authentication code to prevent undetected loss or alteration of the data during transmission.

Open Systems Interconnection (OSI) model overview. There are multiple models trying to introduce a classification for the multiple layers and protocols that comprise the computer networks. OSI is one of the most established and widely accepted models and is a conceptual model that characterizes and standardizes the communication functions of a telecommunication or computing system without regard to its underlying internal structure and technology. The OSI model's goal is the interoperability of diverse communication systems with standard communication protocols. The model partitions a communication system into abstraction layers. The original version of the model had seven layers.

A layer serves the layer above it and is served by the layer below it. For example, a layer that provides error-free communications across a network provides the path needed by applications above it, while it calls the next lower layer to send and receive packets that constitute the contents of that path. Two instances at the same layer are visualized as connected by a horizontal connection in that layer.

Layer 4 of the OSI model, the transport layer, is responsible for transferring data across a network and provides error-checking mechanisms and data flow controls. It determines how much data to send, where the data is sent, and at what rate. The Transmission Control Protocol (TCP) is the best known example of the transport layer.

TCP is one of the main protocols of the Internet protocol suite. The protocol provides a communication service at an intermediate level between an application program and the Internet Protocol. TCP provides host-to-host connectivity at the transport layer of the Internet model. An application does not need to know the particular mechanisms to send data via a link to another host, such as the required IP fragmentation to accommodate the maximum transmission unit of the transmission medium. At the transport layer, TCP handles all handshaking and transmission details and presents an abstraction of the network connection to the application, typically through a network socket interface.

At the lower levels of the protocol stack, due to network congestion, traffic load balancing, or unpredictable network behavior, IP packets may be lost, duplicated, or delivered out of order. TCP detects these problems, requests retransmission of lost data, rearranges out-of-order data and even helps minimize network congestion to reduce the occurrence of other problems. If the data still remains undelivered, the source is notified of this failure. Once the TCP receiver has reassembled the sequence of octets originally transmitted, TCP passes the sequence to the receiving application. Thus, TCP abstracts the application's communication from the underlying networking details.

NAT is a method of remapping one IP address space into another by modifying network address information in the IP header of packets while in transit across a traffic routing device. The technique was originally used as a shortcut to avoid the need to readdress every host when a network was moved. NAT has become a popular and essential tool in conserving global address space in the face of IPv4 address exhaustion. One Internet-routable IP address of a NAT gateway can be used for an entire private network.

IP masquerading is a technique that hides an entire IP address space, usually consisting of private IP addresses, behind a single IP address in another, usually public address space. The hidden addresses are changed into a single (public) IP address as the source address of the outgoing IP packets, so they appear as originating not from the hidden host but from the routing device itself. Because of the popularity of this technique to conserve IPv4 address space, the term NAT has become virtually synonymous with IP masquerading.

As network address translation modifies the IP address information in packets, NAT implementations may vary in their specific behavior in various addressing cases and their effect on network traffic. NAT modifications take place at Layer 3 of the OSI model, when source IP addresses are modified, but not ports, though port modification is technically operable too.

The Dynamic Host Configuration Protocol (DHCP) is a network management protocol used on IP networks whereby a DHCP server dynamically assigns an IP address and other network configuration parameters to each device on a network so they can communicate with other IP networks. A DHCP server enables computers to request IP addresses and networking parameters automatically from the Internet service provider (ISP), reducing the need for a network administrator or a user to manually assign IP addresses to all network devices. In the absence of a DHCP server, a computer or other device on the network needs to be manually assigned an IP address, or to automatically assign itself a private IP address if the Operating System supports this, which will not enable it to communicate outside its local subnet.

DHCP can be implemented on networks ranging in size from home networks to large campus networks and regional Internet service provider networks. A router or a residential gateway can be enabled to act as a DHCP server. Most residential network routers receive a globally unique IP address within the ISP network. Within a local network, a DHCP server assigns a local IP address to each device connected to the network.

AAA refers to Authentication, Authorization and Accounting and is used to refer to a family of protocols that mediate network access. AP, therefore, is an AAA entity in computer networks that provide Internet Protocol (IP) functionality to support the functions of authentication, authorization and accounting.

The present embodiments solve at least some of the above identified problems.

SUMMARY

The embodiments presented describe technologies relating to privacy-preserving access within the context of a VPN service, namely access to a VPN concentrator (VC), or multiple VPN concentrators at such a service provider, where the access is mediated by an Authentication Platform, or multiple APs, local or external as related to VPN Concentrator.

The embodiments describe methods and protocols for preserving user privacy in VPN connectivity transactions involving multiple system entities (i.e., a multitude of VCs and APs) using a minimal and flexible network address assignment system. The system allows a large number of unrelated end-user network endpoints with different public IP addresses to be connected to a VC on behalf of users, using identical private IP addresses and only a small number of symmetric or asymmetric keys held by the users and the VC.

In one of the embodiments, first, the user establishes a VPN tunnel to the VC, initiating the handshake with the VC, revealing only the bare minimum of private information— the Public Key, of the asymmetric encryption key pair the user possesses. The VC forwards the request to the AP, where the Public Key is linked to a user within the AP Database. Then, the AP checks access privilege and potentially also selective partial disclosure of user characteristics of the user on behalf of the VC. Depending on the success or failure of user identification, AP issues an instruction to VC to complete the establishment of the VPN tunnel by finalizing the handshake initiated by the user. The VC messages within the handshake procedure are encrypted with the user Public Key, therefore the user successfully decrypting the messages identifies the user as being associated with a client ID currently registered at the AP. In some implementations, the currently registered client may be the user's actual identifier at the AP. In other embodiments, the client may be mapped to multiple user identities, e.g. to provide for multiple services being served by a shared AP.

Whilst the user and VC finalize the establishment of the VPN tunnel, the IP addresses of the tunnel endpoints are the corresponding public IP addresses that both parties possess. However, within the tunnel with its network layer, a second, internal, network is established, for actual traffic between the user and the targets on the Internet. The network endpoints of both parties, the user and the VC, are uniformly assigned to the same private IP addresses across multiple users' VPN tunnels. This arrangement maintains the internal network configuration of each VPN user as identical, therefore avoiding the burden of dynamic IP address assignment. For the multiple identical internal networks to have access to the Internet, the addresses need to be remapped through another NAT on the same VC. However, for this to happen, the VC internal endpoints need to have their identical internal IP addresses changed to unique IP addresses from another internal network before the packets can be subjected to further processing. Traditional NAT functionality cannot provide for this due to multiple users establishing the VPN tunnel to the VC with identical private IP addresses. As a consequence, the usual network endpoint markers, such as the IP address and Port, no longer uniquely identify the endpoint and custom endpoint identifiers need to be introduced. Therefore, the connectivity is achieved by introducing the programmatic code for changing the IP address of each packet leaving the internal network dynamically and keeping the information about this change in such a fashion that the packets returning to the user from the target server can be traced back to the right VPN tunnel without relying on the IP address/Port combination. For this, a Peer Hashtable—a dynamically maintained storage for registering all VPN user sessions undergoing Network Address modification while traversing through the VC—is used. In some embodiments the format of the Peer Hashtable may be as follows: PubKey_1: PrivIP_2: LocalIP=PrivIP_3, where PubKey_1 is the user's unique Public Key, PrivIP_2 is the private IP address assigned to the VC's endpoint of the VPN tunnel.

The VPN user's internal network configuration, identical across multiple users, allows for avoiding client side hard-coding IP address configuration by modifying the packets leaving the internal network to have a unique IP address belonging to another internal network, as well as registering the VPN user session in the Peer Hashtable with both original VC endpoint IP address PrivIP_2 and the newly assigned IP address PrivIP_3.

After the packets have the unique VC endpoint IP address assigned, the packets are technically submittable to the second NAT and can be passed to the Internet-facing interface of the VC for further travelling to the target, where the source address of the user packets leaving the VC are rewritten to the external public address of the designated VC interface.

The IP address rewriting that is utilized in the methods described in this specification is a custom-code enabled IP address modification at the packet level during the first NAT stage, and the industry standard NAT functionality during the second NAT stage. In the current implementations the custom IP address modifications, differently from the standard NAT, operate on multiple identical private IP addresses and mitigate the uniformity by registering each VPN session's private IP address of the VC endpoint in the Peer Hashtable together with the newly assigned unique private IP address and the corresponding user's Private Key.

The uniform configuration of the private IP addresses for both the user and the VC and associated protocols described in this specification supports the access to the VPN service disassociated from the particular user's network configuration details. Such access involves the identical private IP addresses beyond the establishment of the VPN tunnel and the access is not linkable to any previous or future accesses of the user at the VC.

In one aspect, the present embodiments provide for systems and methods for effectively managing security and privacy measures during a user's connectivity session with a VPN service that by lean design or by security requirements does not include the dynamic management of IP addresses, requires each client to have a IP address assigned beforehand and may thus compromise the user's identity by hard linking the session traces with the client. This is avoided by using a computer program that introduces the double-NAT feature at the network layer and a temporary hash table containing the minimally necessary temporary data to link two NAT sessions together in a secure manner.

In another aspect, the present embodiments solve several problems, including for example: a) managing the assignment of IP addresses for client VPN sessions in a system not capable of dynamic IP management e.g. streamlined lean VPN protocols implementation; and b) avoiding compromising the user's identity by not allowing the VPN user's IP address configuration to be uniquely identified and linked to the activity of the corresponding VPN user on the Internet by means of customized IP address modifications of the user's packets traversing the VC.

DETAILED DESCRIPTION

Figure 1:
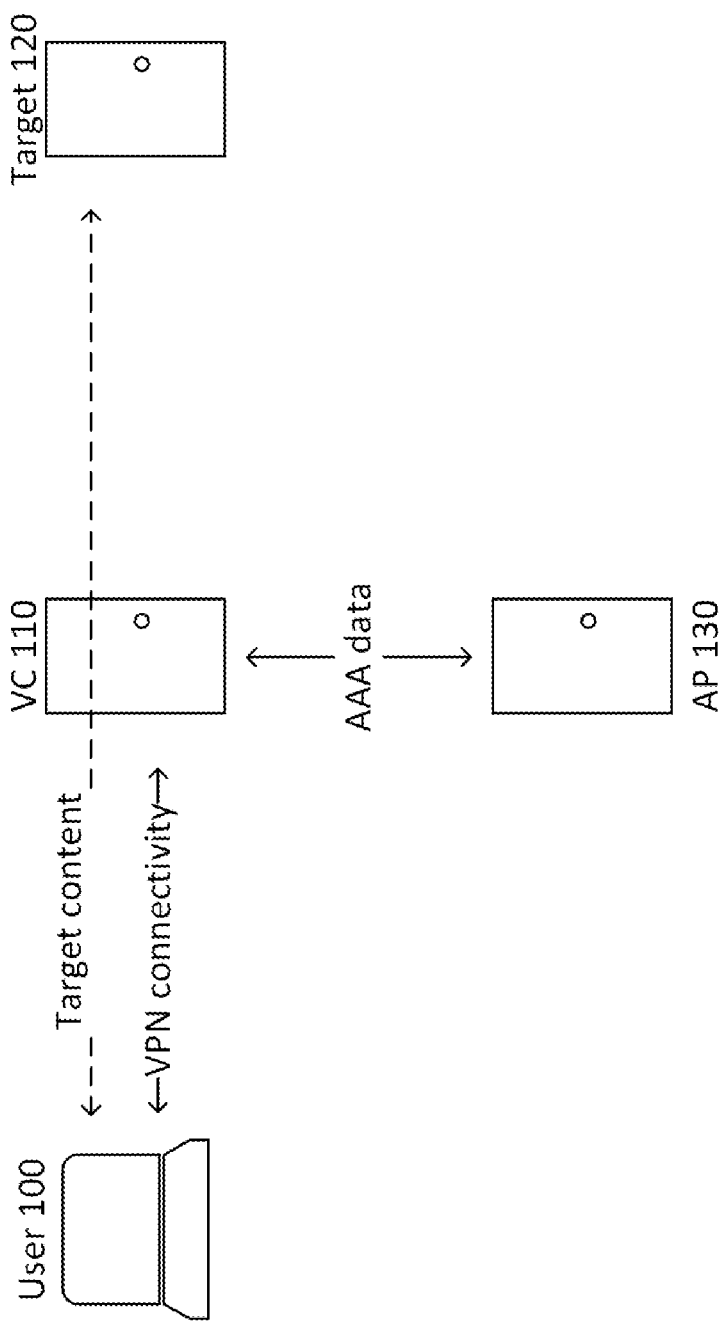
FIG. 1 is a block diagram of an exemplary architectural depiction of components and protocols.

Some general terminology descriptions may be helpful and are included herein for convenience and are intended to be interpreted in the broadest possible interpretation. Elements that are not imperatively defined in the description should have the meaning as would be understood by the person skilled in the art.

VPN user—a person or a business entity that is using VPN services. As a standard placed within a client-grade network, working over such transport links as Wi-Fi, mobile data networks, residential networks. VPN user initiates and establishes the encrypted VPN connection to a VPN Concentrator.

User device—a computing device where a person installs and executes the application that delivers VPN connectivity.

VPN Concentrator—a computing device attached to a computer network that accepts VPN users' requests for establishing encrypted connection, or tunnel, and is the endpoint of such encrypted connections from multiple VPN users. As a standard with VPN tunneling protocol endpoints, on establishing a VPN connection, or tunnel, with a VPN user VPN concentrator becomes the default gateway for the VPN user.

Target or Target server—a server serving any kind of content accessible over multiple protocols over the Internet. Most often a device placed within a datacenter network of high reliability and capability.

Network—a digital telecommunications network that allows nodes to share resources. Examples of a network: local-area networks (LANs), wide-area networks (WANs), campus-area networks (CANs), metropolitan-area networks (MANs), home-area networks (HANs), Intranet. Extranet, Internetwork, Internet.

Tunneling or Tunnel—a protocol that allows for the secure movement of data from one network to another. Tunneling involves allowing private network communications to be sent across a public network, such as the Internet, through a process called encapsulation. The encapsulation process allows for data packets to appear as though they are of a public nature to a public network when they are actually private data packets, allowing them to pass through unnoticed. Encapsulation allows the packets to arrive at their proper destination. At the final destination, decapsulation and decryption occur.

Authentication platform—the component of the VPN service core infrastructure serving the authentication, authorization and accounting requests from the VPN service front-end components facing the user.

Peer Hashtable—a dynamically maintained storage for registering all VPN user sessions undergoing Network Address modification while traversing the VC. In some embodiments the format of the hash table may define the unique Peer, or the unique Tunnel/PN, as follows:

PubKey_1: PrivIP_2: LocalIP=PrivIP_3

In some embodiments the unique identifier for a user may be a pair of credentials, or just a username, with the unique Peer defined as follows:

Username: PrivIP_2: LocalIP=PrivIP_3

The primary purpose of Peer Hashtable is to register the initial and resultant private IP addresses of the VC endpoint for a particular VPN user's session, e.g. Second Private IP address and Third Private IP address, as well as the user's unique identifier that can be a Public Key, or a username, which serves as the key field of the record. The records are dynamically added and removed to the table due to the VPN sessions being opened and closed at the VC. In some embodiments the lifecycle of the Peer Hashtable may be aligned to the status of the VC—the table created when the VC is started and is scrapped when the VC is switched off or the VPN service related processes are stopped.

FIG. 1 illustrates the basic components of the example embodiment of the system comprising user 100, VPN concentrator 110, Target server 120 and Authentication Platform 130. The communication instances between the components may include VPN connectivity between user 100 and VC 110, Authentication, Authorization and Accounting (AAA) data exchange between VC 110 and AP 130, and requesting and obtaining the content by User 100 from a Target 120.

Figure 2:
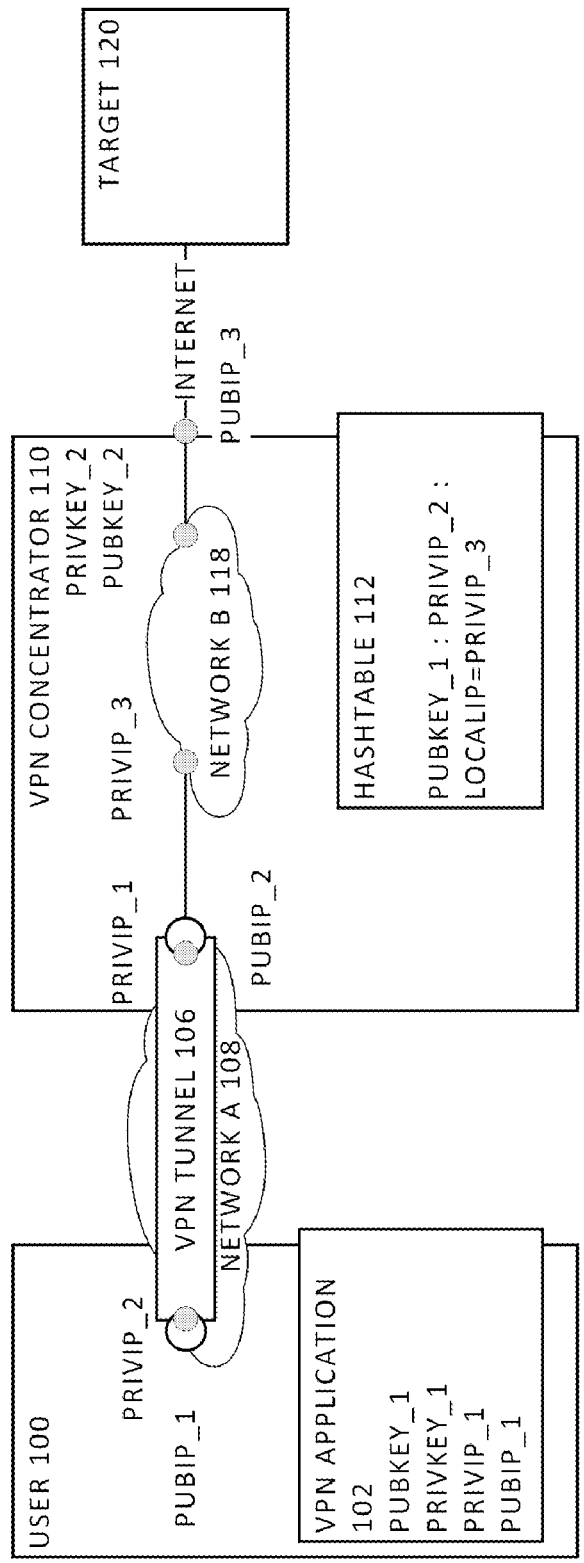
FIG. 2 is a block diagram of an exemplary network layout.

FIG. 2 displays the basic network setup and main network endpoints, as well as their connectivity details, comprising an exemplary embodiment of the system. While connecting to VC 110 via a VPN tunnel, user 100 and VC 110 employ the public IP addresses (PubIP_1 for the user, PubIP_2 for the VC) that both possess and that is pre-configured, for connecting their physical interfaces, as well as two private IP addresses (PrivIP_2 for the user 100 and PrivIP_1 for the VC 110) for connecting the virtual VPN tunnel interfaces. In some embodiments, the private IP addresses used during this stage are pre-configured and explicitly specified in the local configuration files of both endpoints—user 100 and VC 110. Both private addresses PrivIP_1 and PrivIP_2 belong to the same private network 108. Moreover, multiple VPN users have the same PrivIP_2 configured as their private address for establishing VPN connectivity. Technical measures described below allow for such multiple identical user endpoint IP configuration to coexist.

After the VPN tunnel is established, packets are sent therethrough to a destination on the networks behind the VC 110. Then, the packets are operated upon by the VC 110 so that a new private IP address is assigned to the packets as their source address—PrivIP_3. Thus, the first NAT happens. The private IP PrivIP_3 belongs to the private network 118.

The corresponding record of this session, including the source address substitution, is entered and kept within the Hashtable 112 in a format specified below. The purpose of this record is to keep the original private IP-based connection of the VPN tunnel and the NATed connection over the network 112 as related, allowing for packets to be switched seamlessly between them.

If User 100 reaches for the target on the Internet network, the packets within the Network 118 must further be operated upon in order to traverse public networks. Traversing the gateway of the Network 118, the outbound packets are once again subjected to NAT, this time going through the public interface of VC 110, with the public IP PubIP_3 assigned as the source address of the packets. Thus, if User 100 reaches for the target on the Internet, the packets within the Network 118 must further be operated upon in order to traverse public networks. Traversing the gateway of the network 118, the outbound packets are once again subjected to NAT, this time going through the public interface of VC 110, with the public IP PubIP_3 assigned as the source address of the packets. Thus, the second NAT happens, allowing the packets to reach a destination on the Internet.

Since the source addresses of the packets within the network 118 are unique, the second NAT is an industry standard type of network address translation, with the sessions traced through a regular NAT table that is part of a standardized network stack functionalities for modern operating systems. The packets returning from the Internet are converted back to network 118 addresses in accordance with the records within the NAT table.

However, the user endpoints in network 108 do not possess unique IP addresses. Therefore, it is necessary to trace the packets arriving from network 118 to a session happening across network 108. The records in the Peer Hashtable 112 provide for that, allowing the packets to have their source IP address to be again converted to the original PrivIP_2 from the network 108 and attached to a particular user's 100 VPN session, i.e. directed to the corresponding VPN tunnel 106 and ultimately reach user's 100 computing device.

Figure 3:
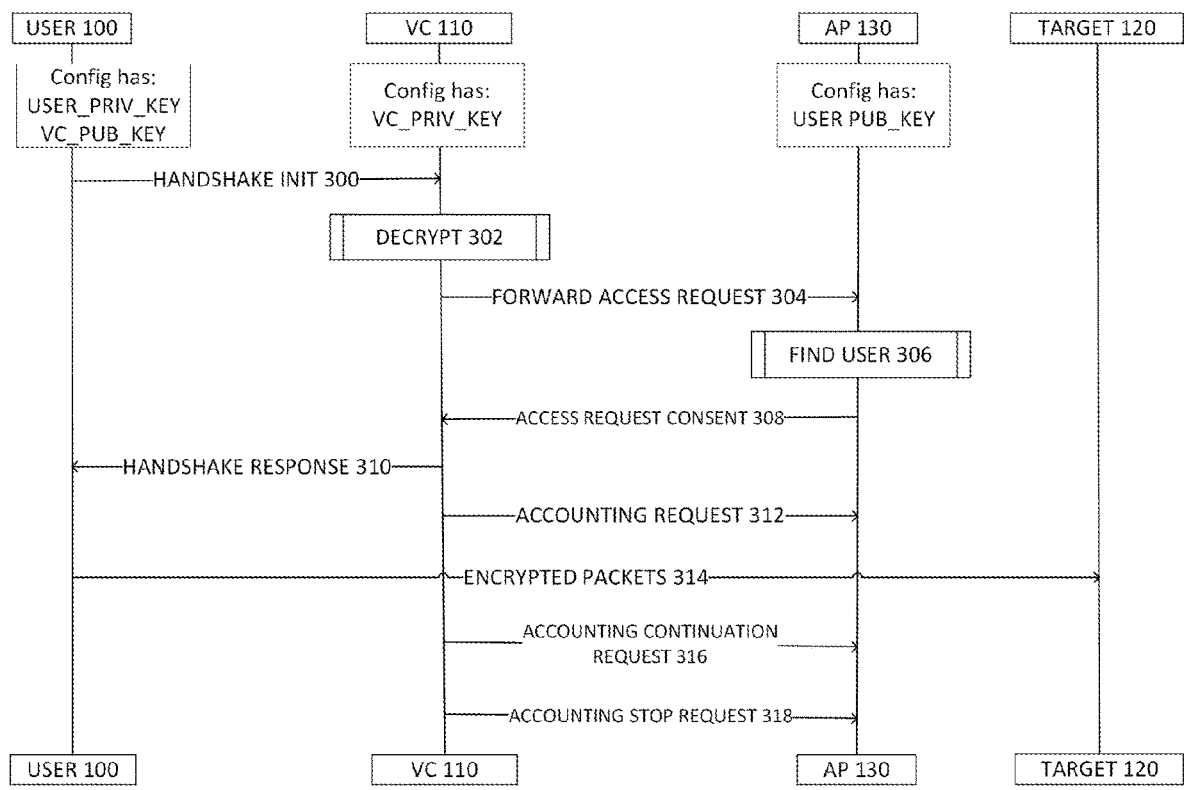
FIG. 3 is a block diagram of an exemplary Authentication Platform setup and protocols.

In the authentication platform setup and protocol embodiment illustrated by FIG. 3, the user 100 initiates a handshake with VC 110 at step 300. At step 302, the VC 110 decrypts the handshake and at step 304, forwards the access request 304 to the AP 130. At step 306, the AP 130 finds user 306, and at step 308, the AP provides requested consent to the VC 110, which in turn provides the handshake response to the user 100 at step 310. Further, at step 312 the VC 110 sends an accounting request to the AP 130. At step 312, the user sends encrypted packets to the target 120, and at step 316, the VC 110 sends an accounting stop request to the AP 130.

FIG. 3 portrays an example of the AAA data exchange between the VC 110 and AP 130, where User 100 initiates (step 300) the connection to VC 110, providing the user's Public Key PubKey_1 (decrypted at step 302) for establishing the VPN tunnel (step 310) foremost, and also to find the user (step 306) in the VPN service customer records at AP 130.

In an embodiment, the AP 130 receives the user's access credential (FIG. 3, step 304), and evaluates if the user is a legitimate VPN service user by comparing the credentials provided with a user database record (FIG. 3, step 306). Upon successful proof of a legitimate VPN user identity to the AP 130, a first access authorization for the user to access VPN service is received via the VC 110 (FIG. 3, step 308).

Figure 4:
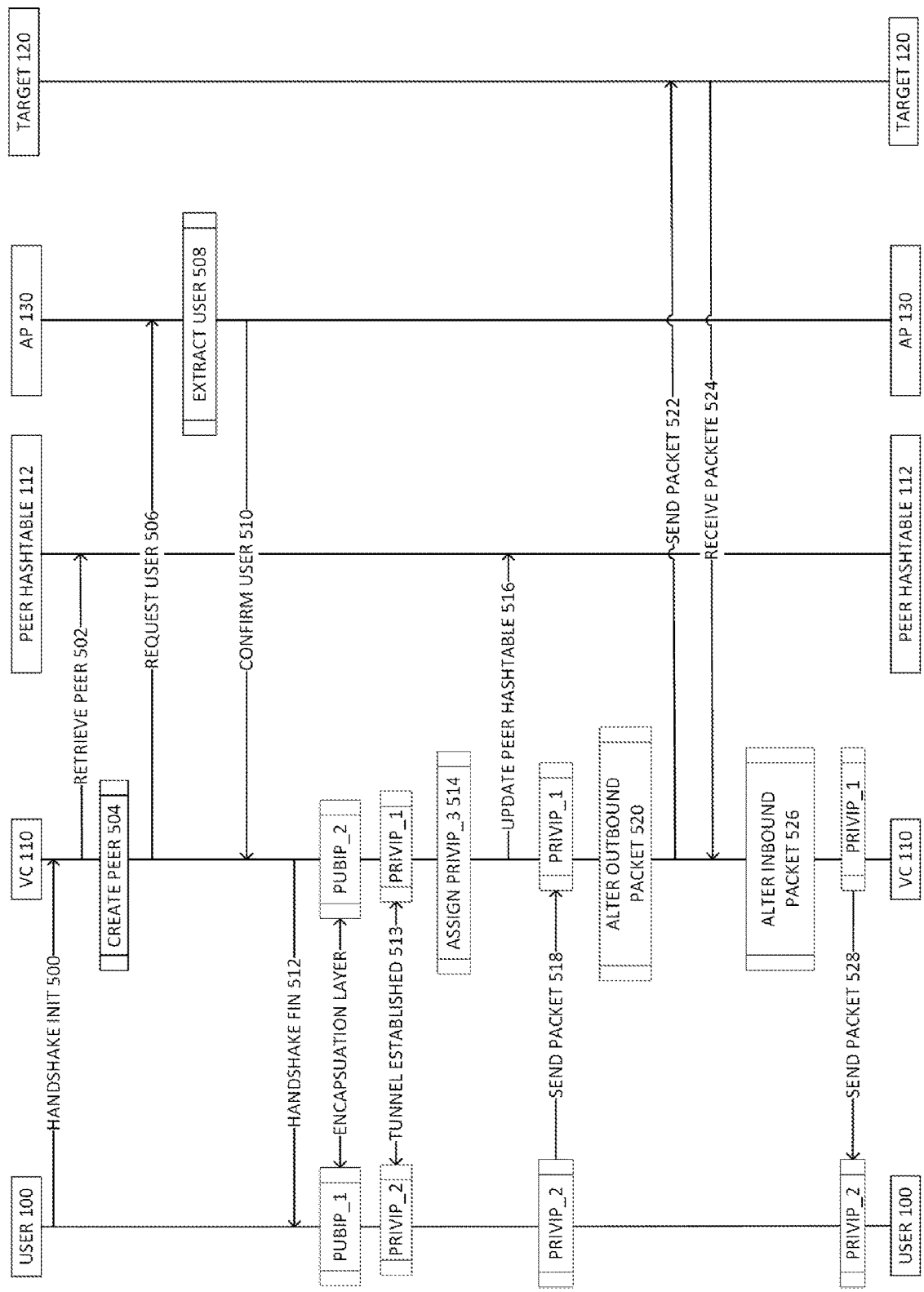
FIG. 4 is an exemplary process/flow diagram.

FIG. 4 demonstrates the operation of an example system implementing the protocols for client privacy-oriented VPN access at a VPN Concentrator (VC) 110, mediated by an Authentication Platform (AP) 130. The entities in the system include at least a user 100 and/or a VPN application 102 (e.g., software component implementing the VPN access system and protocols) operated by the user 100, an AP 130, and an VC 110. In some implementations, there is an existing account relationship between the AP 110 and the VC 110, such that the VC 110 will allow a user 100 to access its services if the user 100 provides proof that it is registered with the AP 130. The user may also have account relationships with the other parties.

In an initial stage, a user first registers with the AP to establish an account with the AP. The account can be based on a pair of user credentials (e.g., a strong credential that is a data string used in a cryptographic function, or a username-password pair) for use at the AP. By using the method described in this specification, after performing the initial authentication with the VPN service provider through whatever means the provider made available, the user can establish a VPN tunnel through a VC using a single cryptographic key, e.g. a Public Key, and the corresponding cryptographic functions (FIG. 3, step 302). In an implementation of the invention the VC may not contain any information about the user throughout the entire time the user is connected to VC through a VPN tunnel, except the Public Key generated for the user during the initial registration.

An AP verifies user access authorization on behalf of VCs (FIG. 3 steps 306-308) and may provide a selective disclosure of user properties to the VC, e.g. username of the connecting client. The AP can itself be a service or content provider that holds certain user information. The AP can obtain the user information through user registration (sometimes with verification documents from other authorities). An example AP can be an authentication service provider based on RADIUS protocol, that already possesses some information of a user through the registration process. The systems and protocols disclosed herein apply to processes that allow an AP to manage users and to further allow users to access a VC under privacy constraints.

In some implementations, the AP may be based on a multi-tier architectural principle, whereas the user's authentication is first submitted to a front-end AP system and at the front-end AP is subsequently submitted for further processing by a back-end AP component.

User authentication at the AP can be accomplished through a client identification system utilizing public-key cryptography, where VC forwards to AP the Public Key the user provided for establishing the VPN tunnel, and AP evaluates the Public Key comparing it to the user records kept within the AP, and replies with "Access granted" or "Access denied" depending on the successful identification of the corresponding user within the AP records. The AP can also exchange verifiable signatures with a user or VC using techniques of public-key cryptography. In some implementations, the AP can provide privately verifiable signatures that can only be verified by the AP itself. As an example, in some embodiments the encryption can be a standard AES method, among others, in some mode of encryption.

Once the AP receives and is satisfied with the user's proof of identity previously registered with the AP and submitted through VC, the AP can provide a confirmation of the user's access authorization (FIG. 4 step 510) and/or selective disclosure of certain user properties to the VC. In some implementations, the AP can sign the reply with an AP signature.

In an embodiment, for example, as depicted by FIG. 4, the process begins at step 500, at which the user 100 initiates a handshake with the VC 100, which, at step 502, retrieves a peer from the peer hashtable 112. At step 504, the VC 110 creates a peer, and at step 506, requests a user from the AP 130, which, at step 508, extracts a user and at step 510 confirms the user to the VC 110. At step 512, the VC 110 indicates to the user 100 that the handshake is finished. At step 513, the user 100 establishes a VPN tunnel with the VC 110, in which the encapsulation layer has a PubIP_1 at the user 100 and a PubIP_2 at the VC 110, and the user 100 has a PrivIP_2, while the VC 110 has a PrivIP_1. At step 510, the VC 110 assigns a PrivIP_3, and at step 516, the VC 110 updates the peer hashtable 112. At step 518, the user 100, with IP address PrivIP_2, sends a packet to the VC 110, with IP address PrivIP_1. At step 520, the VC 110 alters outbound packet, and at step 522 sends the packet to the target 120. At step 524, the VC 110 receives a packet from the target 120, and at step 526, the VC 110 alters the inbound packet. At step 528, the VC 110, from PrivIP_1, sends the packet to the user 100 at the PrivIP_2.

In an embodiment, a computer-implemented method of allowing user access to a Virtual Private Network (BPN) service comprises receiving, at the VPN Concentrator (VC 110), a VPN tunnel establishment request from a user 100 (FIG. 4, step 500) and receiving, from the user, an Identifier at the VC 110. The identifier is verified at an Authentication Platform (AP) 130 (FIG. 4, steps 506-508), which provides access authorization consent to the user through the VC 110 (FIG. 4, step 510). A VPN tunnel is established between the user 100 and the VC 110 (FIG. 4, steps 512-513), wherein an encapsulating layer of the tunnel is between a First Public Internet Protocol (IP) of the user and as Second Public IP of the VC, with both the First Private IP address and the Second Private IP address being associated with a First Private network. A Third Private IP address is assigned to the established VPN tunnel (FIG. 4, step 514) associated with a Second Private network. Packet descriptors, including at least the identifier and the Third Private IP address within a Peer Hashtable (FIG. 4, step 516), are registered at the VC 110. A connection request to a target 120 on the Internet is received from the user 100 through the VC 110 (FIG. 4, step 518). At the VC, a source IP address of packets arriving from the user and leaving the First Private network, is altered (FIG. 4, step 520) to the Third Private IP address. The source IP address of the packets leaving the Second Private Network to a destination on the Internet, is altered to the Third Public IP address. The packets returning from the target 120 (FIG. 4, step 524) are received at the VC's 110 third Public IP address, and the destination address of the packets is converted to the Third Private IP address (FIG. 4, step 526). The tunnel from the Peer Hashtable is resolved using the Third Private IP address. The destination address is altered back to the First Private Address (FIG. 4, step 527), and the packet is sent back to the user via the VPN tunnel (FIG. 4, step 528).

Figure 5:
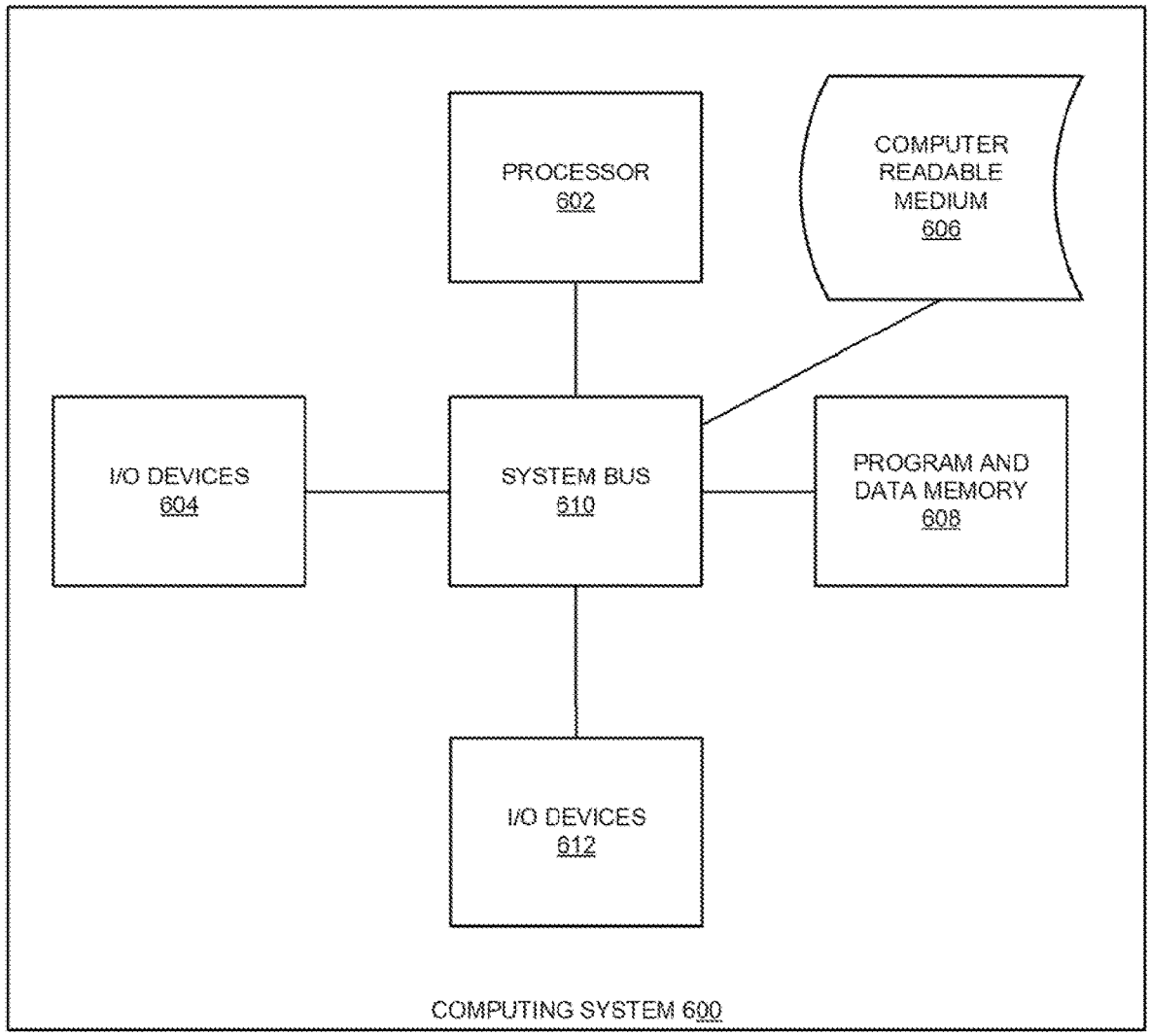
FIG. 5 illustrates a computing system in which a computer readable medium may provide instructions for performing any of the methods disclosed herein.

Any of the above embodiments herein may be rearranged and/or combined with other embodiments. Accordingly, the concepts herein are not to be limited to any particular embodiment disclosure herein. Additionally, the embodiments can take the form of hardware entirely or comprising both hardware and software elements. Portions the embodiments may be implemented in software, which includes, but is not limited to, firmware, resident software, microcode, etc. FIG. 5 illustrates a computing system 300 and which a computer readable medium 606 may provide instructions for performing any of the methods disclosed herein.

Furthermore, the embodiments can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computer system 600.

The medium 606 can be any tangible electronic, magnetic, optical, electromagnetic, infrared, or semiconductor system (or apparatus or device). Examples of a computer readable medium 606 include a semiconductor or solid-state memory, magnetic tape, a removable computer diskette, a random-access memory (RAM), NAND flash memory, a read-only member (ROM), a rigid magnetic disk, and an optical disk. Some examples of optical disks including compact disk-read only memory (CD-ROM), compact disk-read/write (CD-R/W), and digital versatile disc (DVD).

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adaptors may also be coupled to the system to enable the computing system 600 to become coupled to other data processing systems, such as through host systems interfaces 612, or remote printers or storage devices through intervening private or public networks. Modems, cable modem, and Ethernet cards are just a few of the currently available types of network adapters.

The present system(s) and method(s) can be understood more readily by reference to the instant detailed description, examples, and claims. It is to be understood that the system(s) and method(s) detailed herein are not limited to the specific systems, devices, and/or methods disclosed unless otherwise specified, as such can, of course, vary. It is also to be understood that the terminology used herein is for the purpose of describing particular aspects only and is not intended to be limiting.

The instant description of the system(s) and method(s) detailed herein is provided as an enabling teaching of the system(s) and method(s) detailed herein in their best, currently known aspect. Those skilled in the relevant art will recognize that many changes can be made to the aspects described, while still obtaining the beneficial results of the present system(s) and method(s) detailed herein. It will also be apparent that some of the desired benefits of the system(s) and method(s) detailed herein can be obtained by selecting some of the features of the system(s) and method(s) detailed herein without utilizing other features. Accordingly, those who work in the art will recognize that many modifications and adaptations to the system(s) and method(s) detailed herein are possible and can even be desirable in certain circumstances and are a part of the system(s) and method(s) detailed herein. Thus, the instant description is provided as illustrative of the principles of the system(s) and method(s) detailed herein and not in limitation thereof.

As used herein, the singular forms "a," "an" and "the" include plural referents unless the context clearly dictates otherwise. Thus, for example, reference to a "body" includes aspects having two or more bodies unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects of the system(s) and method(s) detailed herein have been disclosed in the foregoing specification, it is understood by those skilled in the art that many modifications and other aspects of the system(s) and method(s) detailed herein will come to mind to which the invention pertains, having the benefit of the teaching presented in the foregoing description and associated drawings.

It is thus understood that the system(s) and method(s) detailed herein is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described system(s) and method(s) detailed herein.

What is claimed is:

1. A method implemented by a virtual private network (VPN) concentrator, comprising:
    receiving a request from a user device to establish a VPN tunnel, the request being received from a first public internet protocol (IP) address of the user device at a second public IP address of the VPN concentrator;
    establishing the VPN tunnel, wherein a first private IP address of the VPN concentrator and a second private IP address of the user device constitute endpoints of the VPN tunnel, wherein the second private IP address of the user device is assigned to multiple user devices;
    associating a third private IP address with the VPN tunnel;
    generating an entry in a peer hashtable, wherein the entry maps a combination of a unique identifier associated with the user device, the second private IP address, and the first public IP address to the third private IP address, wherein the unique identifier comprises a public encryption key used by the user device to encrypt data for transmission over the VPN tunnel;
    receiving, at the first private IP address, an outbound packet for transmission to a target from the user device via the second private IP address, the outbound packet having the second private IP address as a source address;
    identifying, based on the entry, the third private IP address associated with the VPN tunnel in the peer hashtable;
    performing a substitution of the second private IP address with the third private IP address in a header of the outbound packet, wherein the substitution is performed based on the entry, to replace the source address of the outbound packet;
    performing network address translation (NAT) on the outbound packet to replace the third private IP address with a third public IP address of the VPN concentrator as the source address in the header of the outbound packet prior to transmitting the outbound packet to the target; and
    transmitting the outbound packet to the target.

2. The method of claim 1, wherein the first private IP address and the second private IP address are associated with at least one other VPN tunnel between the VPN concentrator and another user device.

3. The method of claim 1, wherein the user device is pre-configured to use the second private IP address.

4. The method of claim 1, wherein the VPN concentrator is pre-configured to use the first private IP address.

5. The method of claim 1, wherein the request to establish the VPN tunnel includes the public encryption key.

6. The method of claim 1, wherein the unique identifier comprises a user property associated with a user of the user device who is authorized to have the VPN tunnel established.

7. The method of claim 6, further comprising:
    transmitting, by the VPN concentrator, a request to an authentication service that includes the public encryption key received in the request to establish the VPN tunnel; and
    receiving, at the VPN concentrator, the user property from the authentication service.

8. The method of claim 1, further comprising:
    performing NAT on an inbound packet received from the target to replace the third public IP address with the third private IP address;
    identifying the second private IP address based on a lookup using the third public IP address in the peer hashtable; and
    substituting the third private IP address with the second private IP address in a header of the inbound packet; and
    transmitting the inbound packet to the first private IP address.

9. A system, comprising:
    a memory; and
    a processor, the processor configured to execute instructions of a virtual private network (VPN) concentrator and stored in the memory to:
    receive a request from a user device to establish a VPN tunnel, the request received from a first public internet protocol (IP) address of the user device at a second public IP address of the VPN concentrator;
    establish the VPN tunnel, wherein a first private IP address of the VPN concentrator and a second private IP address of the user device constitute endpoints of the VPN tunnel, wherein the second private IP address of the user device is assigned to multiple user devices;
    associate a third private IP address with the VPN tunnel;
    generate an entry in a peer hashtable, wherein the entry maps a combination of a unique identifier associated with the user device, the second private IP address, and the first public IP address to the third private IP address, wherein the unique identifier comprises a public encryption key used by the user device to encrypt data for transmission over the VPN tunnel;
    receive, at the first private IP address, an outbound packet for transmission to a target from the user device via the second private IP address, the outbound packet having the second private IP address as a source address;
    identify, based on the entry, the third private IP address associated with the VPN tunnel in the peer hashtable;
    perform a substitution of the second private IP address with the third private IP address in a header of the outbound packet, wherein the substitution is performed based on the entry, to replace the source address of the outbound packet;
    replace the third private IP address in the outbound packet with a third public IP address of the VPN concentrator as the source address in the header of the outbound packet prior to transmitting the outbound packet to the target; and
    transmit the outbound packet to the target.

10. The system of claim 9, wherein the first private IP address and the second private IP address are associated with at least one other VPN tunnel between the VPN concentrator and another user device.

11. The system of claim 9, wherein the user device is pre-configured to use the second private IP address.

12. The system of claim 9, wherein the VPN concentrator is pre-configured to use the first private IP address.

13. The system of claim 9, wherein the request to establish the VPN tunnel includes the public encryption key.

14. The system of claim 9, wherein the unique identifier comprises a user property associated with a user of the user device who is authorized to have the VPN tunnel established.

15. The system of claim 14, wherein the processor is further configured to execute instructions stored in the memory to:
- transmit, by the VPN concentrator, a request to an authentication service that includes the public encryption key received in the request to establish the VPN tunnel; and
- receive, at the VPN concentrator, the user property from the authentication service.

16. The system of claim 9, wherein the processor is further configured to execute instructions stored in the memory to:
- replace, in an inbound packet received from the target, the third public IP address with the third private IP address;
- identify the second private IP address based on a lookup using the third public IP address in the peer hashtable; and
- substitute the third private IP address with the second private IP address in a header of the inbound packet; and
- transmit the inbound packet to the first private IP address.

17. A non-transitory computer readable medium storing instructions operable to cause one or more processors to perform operations implemented by a virtual private network (VPN) concentrator for privacy-preserving access to a VPN service, the operations comprising:
- receiving a request from a user device to establish a VPN tunnel, the request being received from a first public internet protocol (IP) address of the user device at a second public IP address of the VPN concentrator;
- establishing the VPN tunnel, wherein a first private IP address of the VPN concentrator and a second private IP address of the user device constitute endpoints of the VPN tunnel, wherein the second private IP address of the user device is assigned to multiple user devices;
- associating a third private IP address with the VPN tunnel;
- generating an entry in a peer hashtable, wherein the entry maps a combination of a unique identifier associated with the user device, the second private IP address, and the first public IP address to the third private IP address, wherein the unique identifier comprises a public encryption key used by the user device to encrypt data for transmission over the VPN tunnel;
- receiving, at the first private IP address, an outbound packet for transmission to a target from the user device via the second private IP address, the outbound packet having the second private IP address as a source address;
- identifying, based on the entry, the third private IP address associated with the VPN tunnel in the peer hashtable;
- performing a substitution of the second private IP address with the third private IP address in a header of the outbound packet, wherein the substitution is performed based on the entry, to replace the source address of the outbound packet;
- performing network address translation (NAT) on the outbound packet to replace the third private IP address with a third public IP address of the VPN concentrator as the source address in the header of the outbound packet prior to transmitting the outbound packet to the target; and
- transmitting the outbound packet to the target.

18. The non-transitory computer readable medium of claim 17, wherein the first private IP address and the second private IP address are associated with at least one other VPN tunnel between the VPN concentrator and another user device.

19. The non-transitory computer readable medium of claim 17, wherein the user device is pre-configured to use the second private IP address, and wherein the VPN concentrator is pre-configured to use the first private IP address.

20. The non-transitory computer readable medium of claim 17, wherein the request to establish the VPN tunnel includes the public encryption key.

* * * * *